Figure 1:
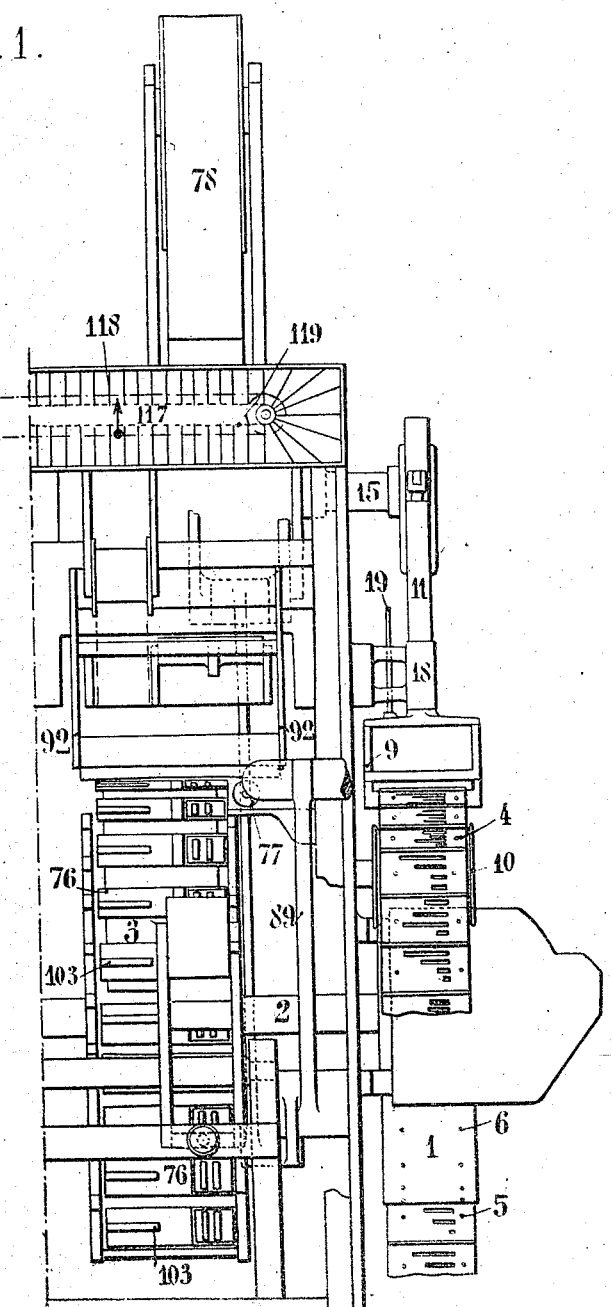

G. I. F. SOULAGE.
APPARATUS FOR THE CONTROL AND THE REGISTRATION OF THE OPERATIONS PERFORMED
BY DISTRIBUTING MACHINES.
APPLICATION FILED JUNE 19, 1906.

941,892.

Patented Nov. 30, 1909.
10 SHEETS—SHEET 1.

WITNESSES:
W. M. Avery
J. P. Davis

INVENTOR
Georges Isidore Ferdinand Soulage
BY
Munn & Co
ATTORNEYS

G. I. F. SOULAGE.
APPARATUS FOR THE CONTROL AND THE REGISTRATION OF THE OPERATIONS PERFORMED BY DISTRIBUTING MACHINES.
APPLICATION FILED JUNE 19, 1906.
941,892.
Patented Nov. 30, 1909.
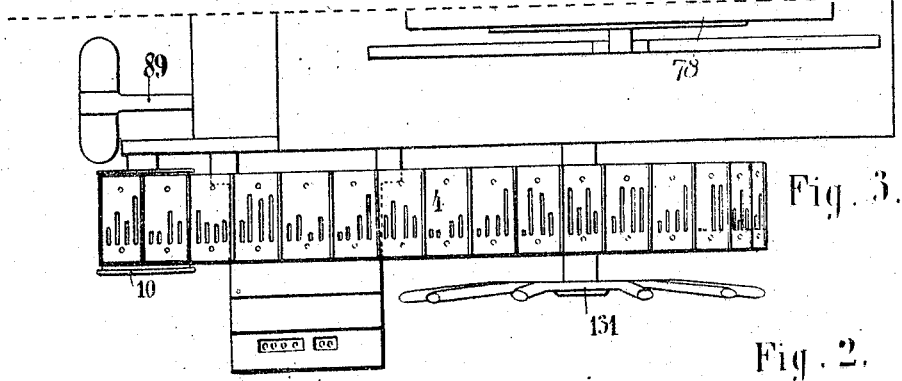
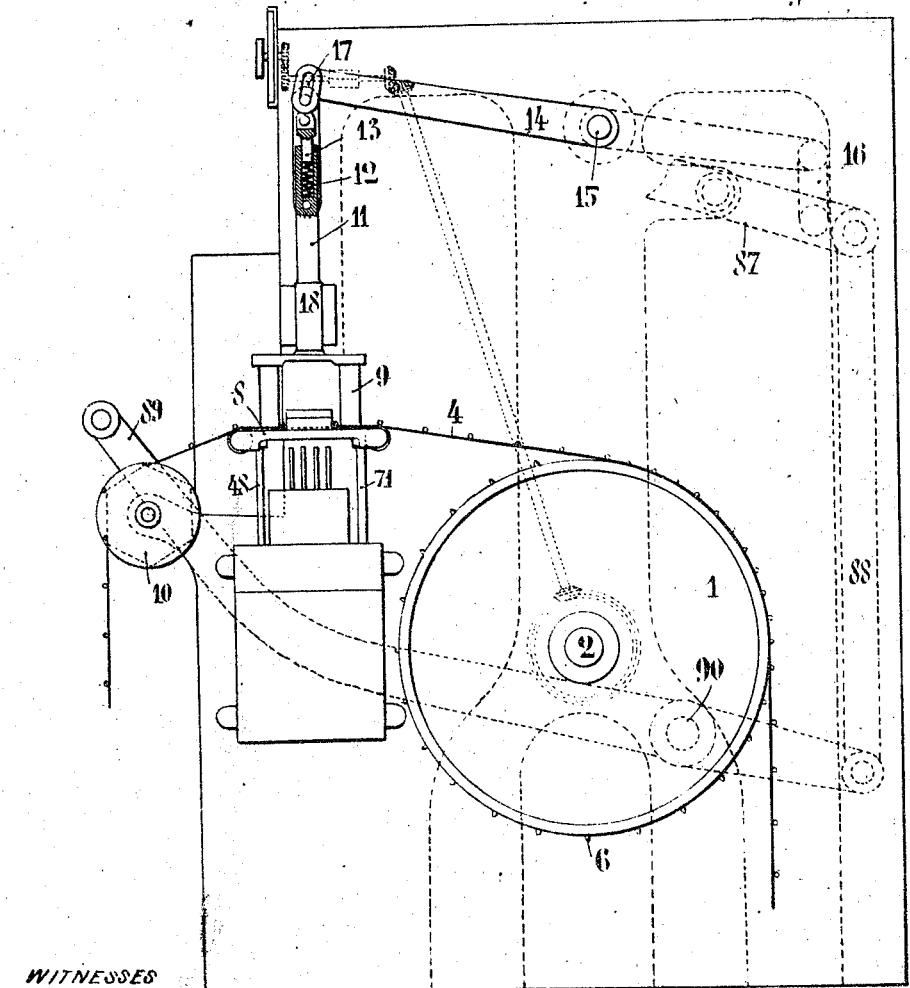

G. I. F. SOULAGE.
APPARATUS FOR THE CONTROL AND THE REGISTRATION OF THE OPERATIONS PERFORMED BY DISTRIBUTING MACHINES.
APPLICATION FILED JUNE 19, 1906.

941,892.

Patented Nov. 30, 1909.
10 SHEETS—SHEET 4.

WITNESSES
W. M. Avery
J. P. Davis

INVENTOR
Georges Isidore Ferdinand Soulage
BY
Munn & Co.
ATTORNEYS

G. I. F. SOULAGE.
APPARATUS FOR THE CONTROL AND THE REGISTRATION OF THE OPERATIONS PERFORMED
BY DISTRIBUTING MACHINES.
APPLICATION FILED JUNE 19, 1906.

941,892.

Patented Nov. 30, 1909.
10 SHEETS—SHEET 5.

WITNESSES:
W. M. Avery
J. P. Davis

INVENTOR
Georges Isidore Ferdinand Soulage
BY
Munn & Co.
ATTORNEYS

G. I. F. SOULAGE.
APPARATUS FOR THE CONTROL AND THE REGISTRATION OF THE OPERATIONS PERFORMED BY DISTRIBUTING MACHINES.
APPLICATION FILED JUNE 19, 1906.

941,892.

Patented Nov. 30, 1909.
10 SHEETS—SHEET 7.

WITNESSES
W. M. Avery
J. P. Davis

INVENTOR
Georges Isidore Ferdinand Soulage
BY
Munn & Co.
ATTORNEYS

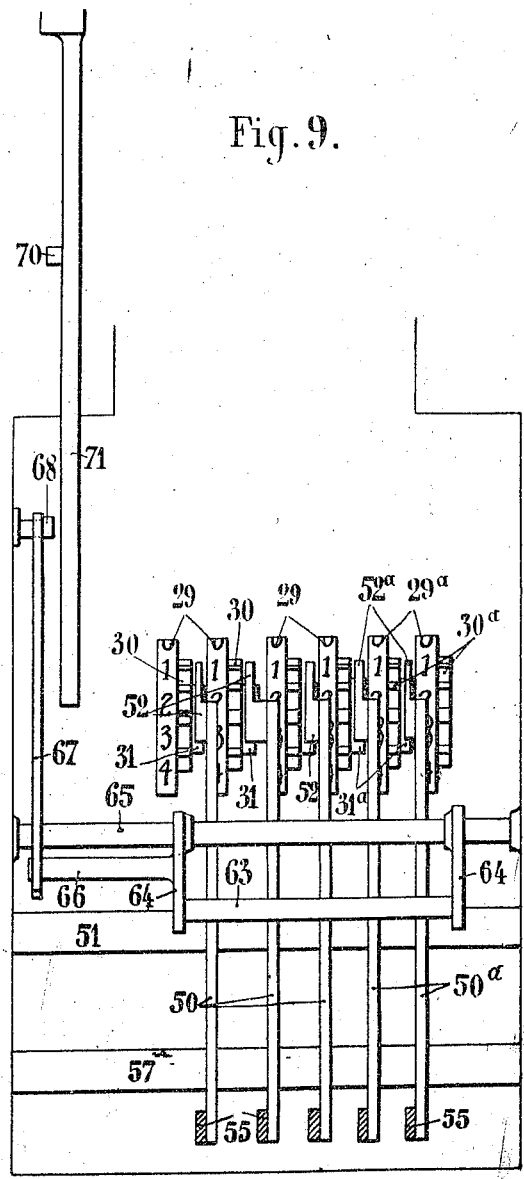

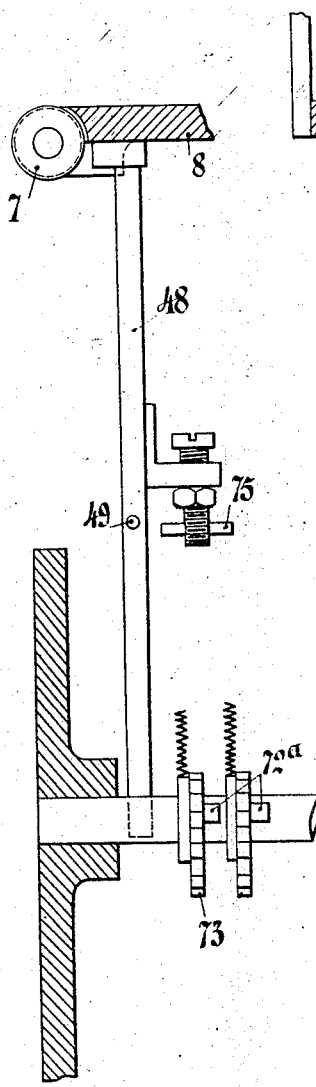
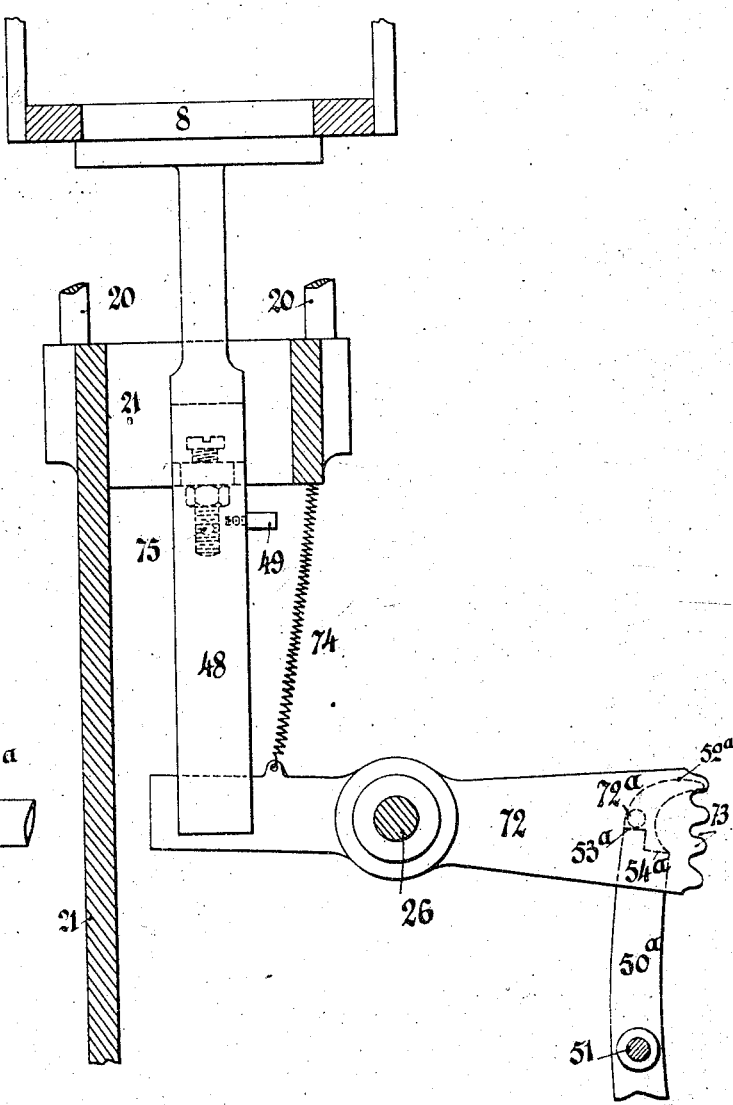

G. I. F. SOULAGE.
APPARATUS FOR THE CONTROL AND THE REGISTRATION OF THE OPERATIONS PERFORMED
BY DISTRIBUTING MACHINES.
APPLICATION FILED JUNE 19, 1906.

941,892.

Patented Nov. 30, 1909.
10 SHEETS—SHEET 10.

WITNESSES:
W. M. Avery
J. P. Davis

INVENTOR
Georges Isidore Ferdinand Soulage
BY
ATTORNEYS

UNITED STATES PATENT OFFICE.

GEORGES ISIDORE FERDINAND SOULAGE, OF PARIS, FRANCE, ASSIGNOR TO SOCIÉTÉ UNIVERSELLE DES APPAREILS CONTROLEURS, OF PARIS, FRANCE.

APPARATUS FOR THE CONTROL AND THE REGISTRATION OF THE OPERATIONS PERFORMED BY DISTRIBUTING-MACHINES.

941,892.   Specification of Letters Patent.   Patented Nov. 30, 1909.

Application filed June 19, 1906. Serial No. 322,390.

*To all whom it may concern:*

Be it known that I, GEORGES ISIDORE FERDINAND SOULAGE, of 44 Rue Chauzy, in the city of Paris, Republic of France, mining engineer, have invented an Apparatus for the Control and the Registration of the Operations Performed by a Distributing-Machine, of which the following is a full, clear, and exact description.

The present invention relates to a device for controlling and registering the operations performed by distributing machines of all kinds and more particularly to machines for distributing railway tickets.

The object of the invention is to add up the amounts of the individual sums borne by the tickets issued.

The device comprises broadly a band composed of flat links having transverse perforations corresponding to units, tenths, and hundredths of francs and to tens of francs. Each of the links is adapted to be brought into a position with the transverse perforations above a series of vertically movable pieces, the number of such piece corresponding to the number of perforations of the links and the upper end of each piece is provided with ten gradations or steps representing respectively, the ten numbers 0, to 9. The pieces carrying the steps or gradations are provided each with racks, which racks through suitable mechanism drive the wheels of the adding apparatus.

When a ticket is issued by the distributing machine the band receives automatically first a movement whereby to bring a link having transverse perforations corresponding to the price of the ticket sold above the vertically movable pieces, and second a vertical movement in a horizontal plane whereby to move the link into engagement with the different steps or gradations of the vertically movable pieces, whereby to carry the pieces vertically downward in order to move the adding wheels to add the price of the ticket sold. It will be understood that since the transverse perforations are of an equal length and are differently arranged on each link, the said link will engage the vertically movable pieces on steps or gradations corresponding to the length of the perforation and will force the said pieces downward a proportionate distance of the full travel of the said pieces.

The accompanying drawing shows by way of example the subject of the present invention in combination with a machine for distributing railway tickets.

Figure 4:
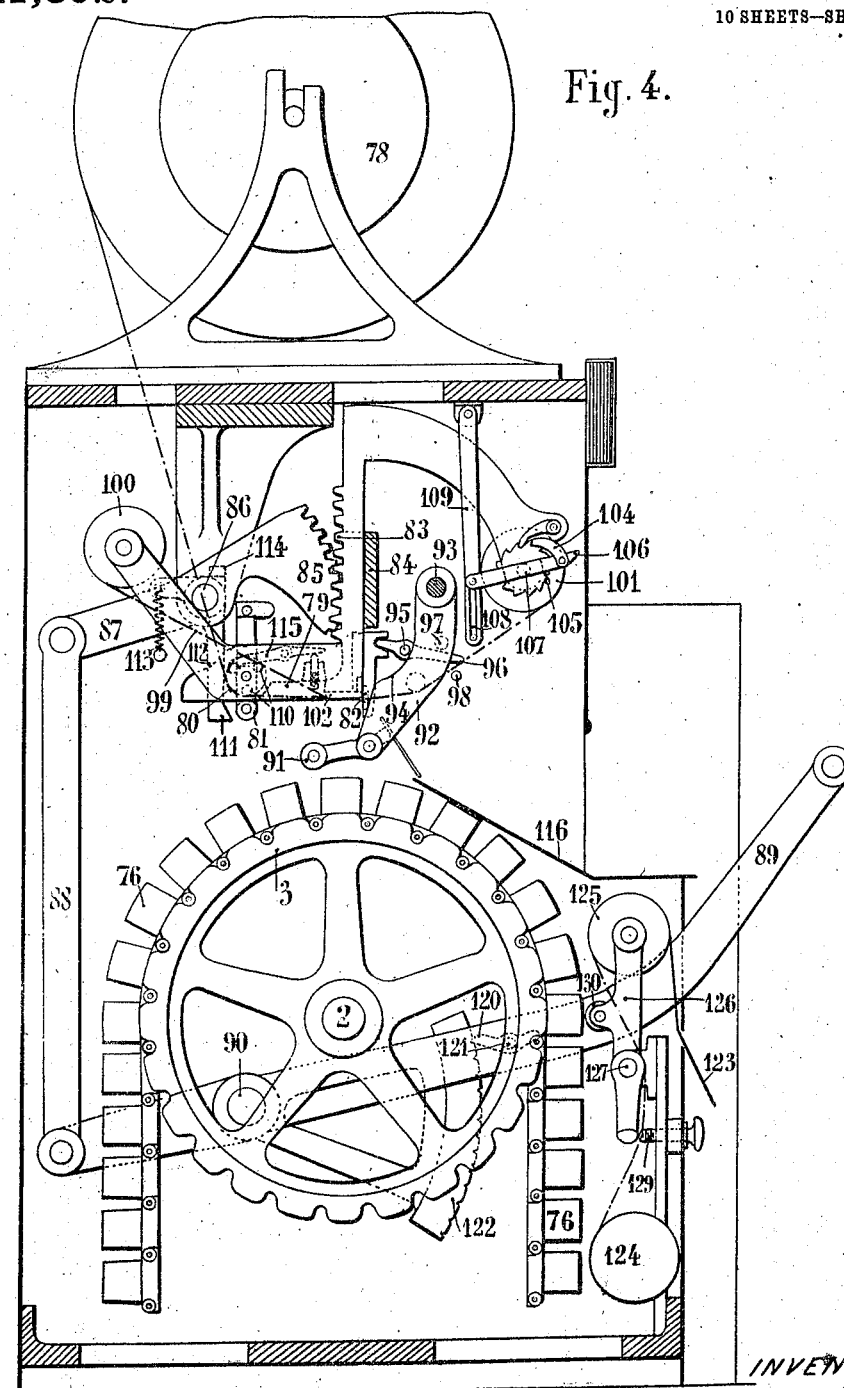
Figure 5:
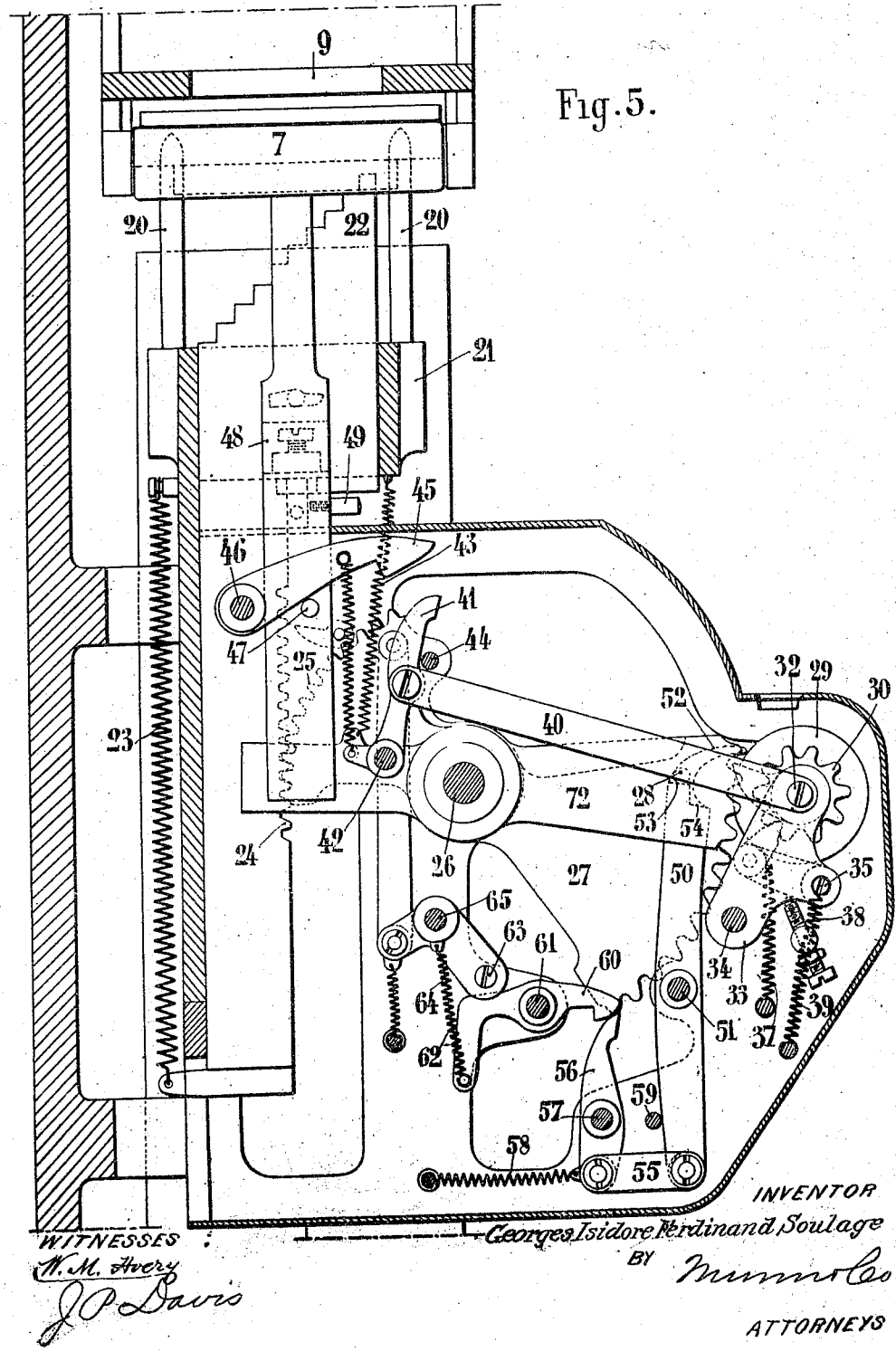
Figure 6:
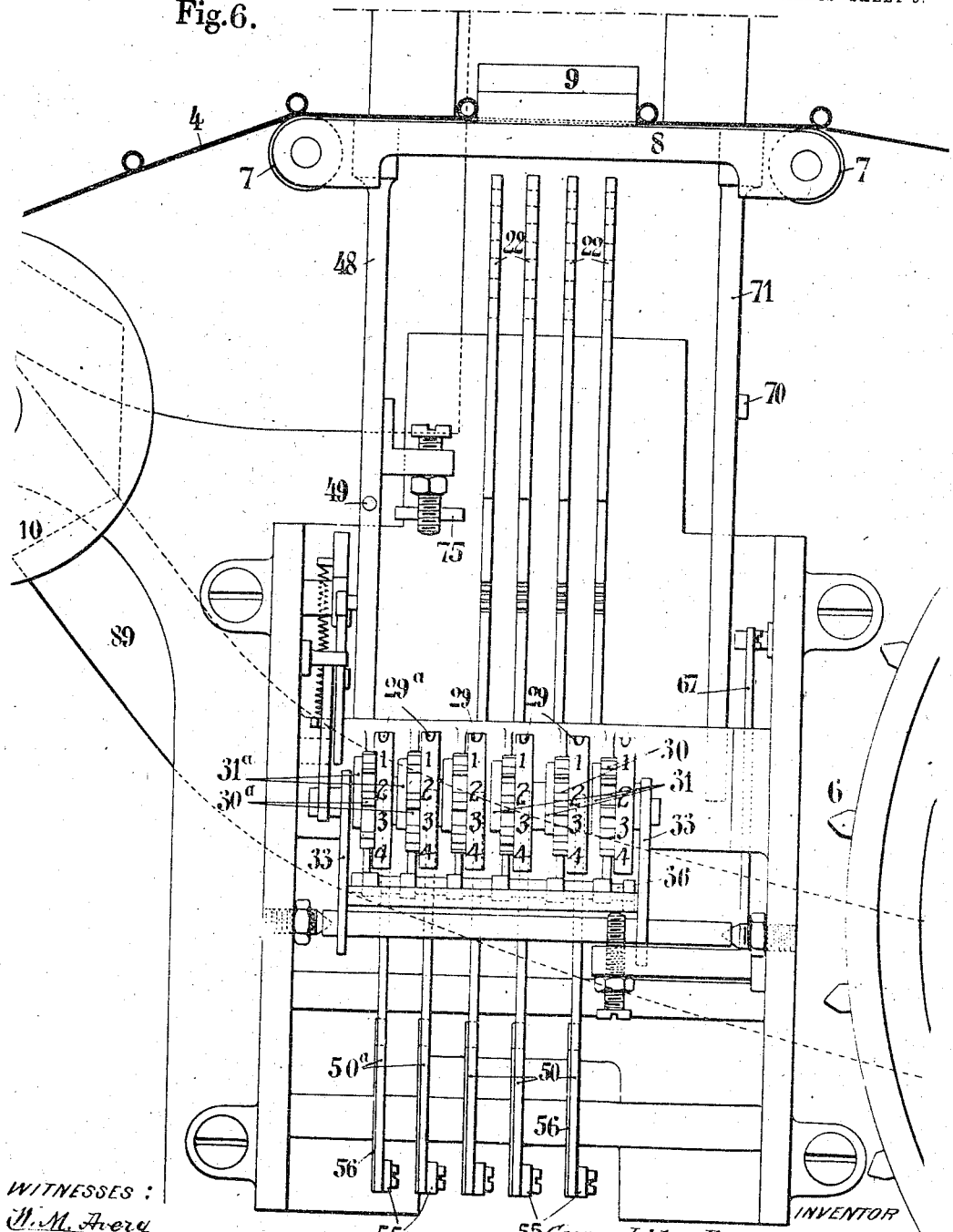
Figure 7:
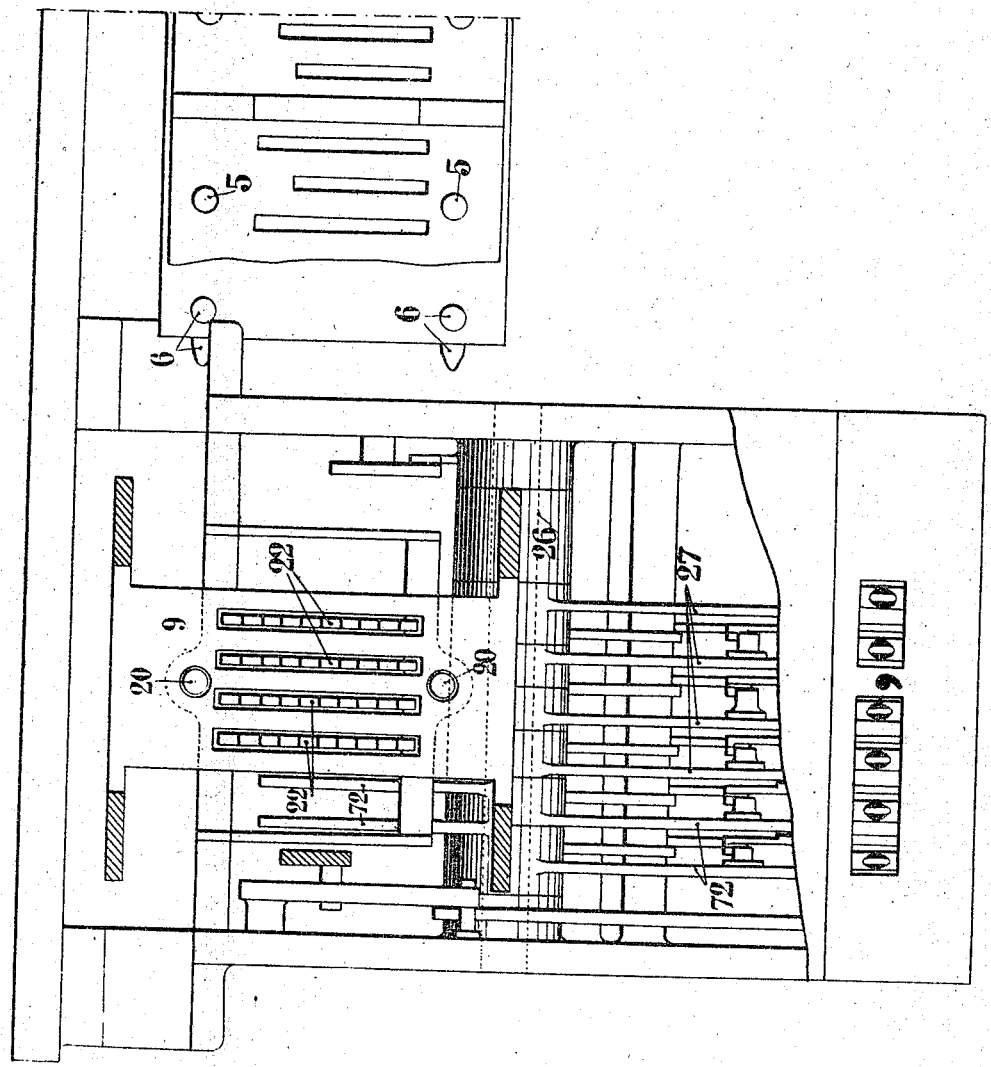
Figures 8, 10:
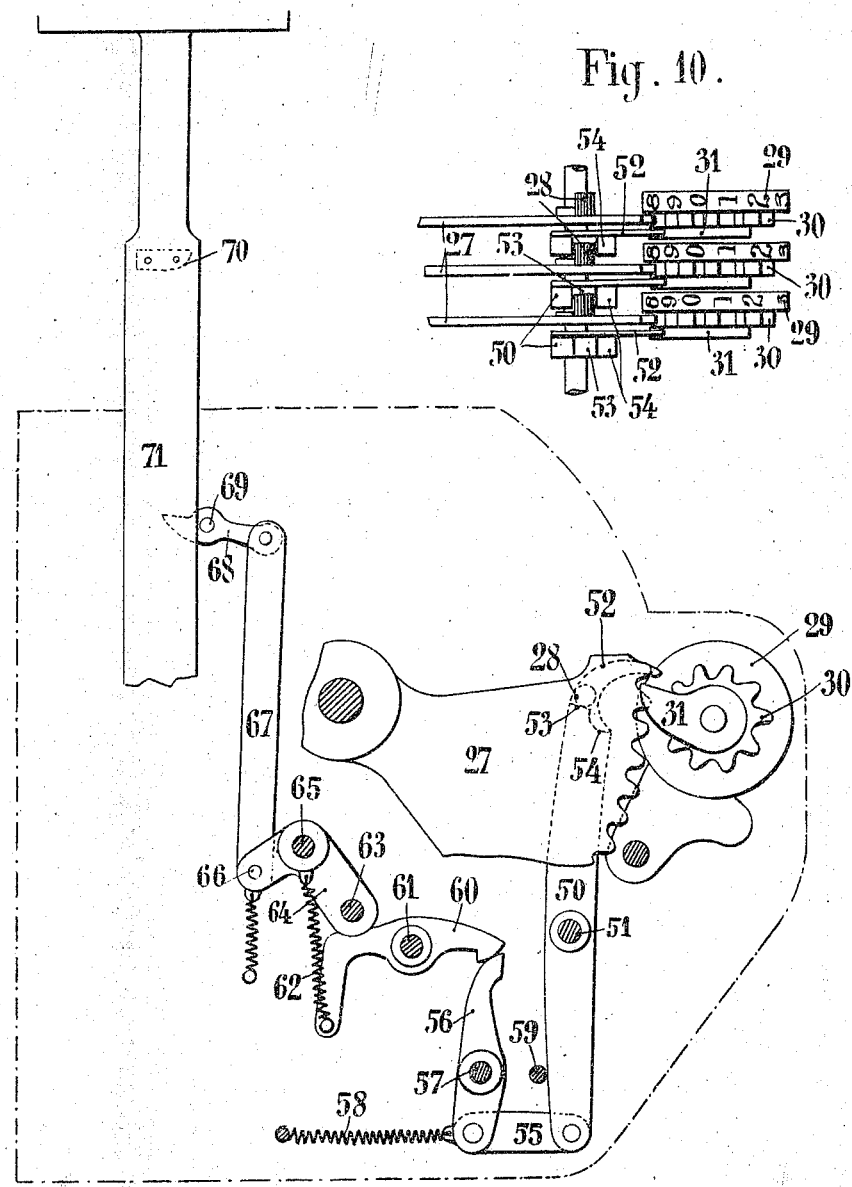
Figure 13:
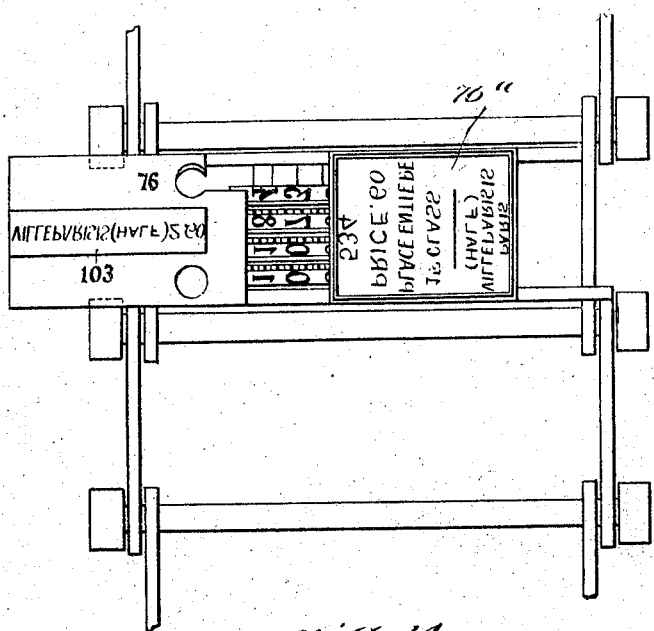
Figure 14:
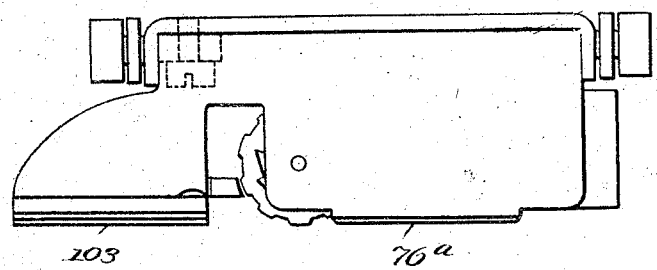

Figure 1 is a front view of a portion of the apparatus. Fig. 2 is a side elevation viewed from the side of the totaling apparatus. Fig. 3 is a plan corresponding to Fig. 2. Fig. 4 is a side elevation viewed from the side of the printing and totaling apparatus. Figs. 5, 6 and 7 show in front view, side view and plan respectively on a larger scale, the totaling apparatus, and Figs. 8, 9 and 10 show in front view, side view and plan the device for operating the summing up mechanism. Figs. 11 and 12 show in front and side view respectively the arrangement for operating the transfer of the units higher than those corresponding to the price marked on the tickets distributed. Figs. 13 and 14 are a plan and side view respectively of one of the blocks.

In the present embodiment of my invention, a tension drum 1 is keyed on a shaft 2, which shaft also carries a drum 3, having on the periphery thereof impression blocks of the ticket distributing machine, which machine may be of any desired form.

A band comprising a plurality of flat links 4 passes over the drum, the said links being jointed to each other and each being provided with a group or series of transverse perforations of various lengths, the length of the perforations having arbitrary values corresponding to the numbers 0, 1, 2, 3, 4, 5, 6, 7, 8, 9, each link bearing for example four transverse perforations, the first corresponding to hundredths of francs, the second to tenths, the third to units, and the fourth to tens of francs.

The various combinations of arbitrary values of the transverse perforations borne by the different links of the band represent the prices of the tickets adapted to be used by the distributing machine. Each link is provided with holes 5 in which engage projections 6 carried by the tension drum 1 whereby to insure proper registration of the band at all times. The said band passes over rollers 7 carried by a cage 8, and the band is held by the rollers against a grid 9 mounted on the cage above the said band. The band 4 is also supported by a polygonal drum 10 which drum acts as a stretcher.

The cage 8 which is movable vertically is provided at its upper end with a rod 11 (Fig. 2) having a recess at its free end, for receiving a piston 13, a spring 12 being arranged between the end of the piston and the end of the recess. The piston is connected to the end of a lever 14 journaled upon the shaft 15 and connected by a connecting rod 16, with the operating device of the distributing machine as will be hereinafter explained. The pivot pin of the piston 13 moves in a slot 17 in the end of the lever 14 in order to permit of lost motion between the piston and the lever. The cage 8 is guided in its vertical movement by a sleeve 18 encircling the rod 11 and connected with a bracket on the frame of the machine and a guide rod 19 connected with the cage and passes upward through openings in the bracket for preventing rotation of the cage with respect to the rod.

The truing of the links of the band is insured by two spindles or pins 20, Figs. 4 and 6, carried by a fixed piece 21 which pins engage in the holes 5 of the link when the said links are presented in position above the cage. A grid 9 is provided with a recess therethrough corresponding to the space covered by the transverse perforations and below the cage and opposite this recess are arranged a plurality of vertically movable pieces or plates 22. The upper end of each of said plates is provided with a series of ten steps or gradations, and the distance from the base of the rise of the top step to the front of the piece 22 corresponds to the length of the shortest of the transverse perforations of the link, which transverse perforation is given an arbitrary value of 9, while the distance from the base of the rise of the next to the lowest step to the front of the plate 22 corresponds to the longest of the transverse perforations, to which is given an arbitrary value of 1.

It will be evident from the description that when a transverse perforation is immediately above one of the pieces 22 and the link is moved downward, a portion of the piece will pass through the perforation corresponding to the length thereof. If the said perforation is for instance, equal to the distance from the rise of the step representing the arbitrary value of 7, to the front of the plate, the plate 22 will be depressed during the further travel of the link a distance equal to nine-tenths of the distance which it would be depressed should there be no perforation in the link immediately above the said plate. Each of the pieces or plates 22 is movable in grooves formed in the guide pieces 21 and is normally maintained in its upward position by a spring 23. Each of the plates is provided with a rack 24 meshing with a toothed sector 25 journaled on the shaft 26, and having integral therewith another toothed sector 27 which is adapted to mesh at suitable times with the pinions of the totaling apparatus to be hereinafter described.

The totaling apparatus comprises a plurality of figure wheels 29, each having integral therewith a pinion 30 provided with ten teeth, the figure wheels being journaled on a shaft 32, carried by a frame comprising the end plates 33 connected with said shaft 32, and pivoted on a shaft 34. The said frame carries a shaft 35, upon which is journaled the frame 36, the said frame being provided with a pawl for each pinion 30 and being normally acted on by a spring 37 to engage the pawls with the pinions. A stop screw 38 is provided against which the pawl carrying frame rests, and a second spring 39 normally tends to retain the totaling apparatus with the pinions out of engagement with the totaling sectors 27.

The shaft 32 carrying the number wheels and pinions is connected by a rod 40 with one arm of an elbow lever 41 journaled on a shaft 42, the other arm of the elbow lever being connected by a spring 43, with a pawl 45, journaled on a shaft 46, and adapted to engage an arm of the elbow lever 41 connected to the rod 40 when said arm is in its rearward position as clearly shown in Fig. 4. Stops 44 and 47 are provided for limiting the movement of the elbow lever 41 and the pawl 46, respectively.

The cage 8 is provided with a depending rod 48 having thereon a stop 49 adapted when the cage is depressed to engage with the arm of the elbow lever 41 not connected with the rod 40 whereby to rock said elbow lever on its point of pivotal connection to move the rod 40 rearwardly and to lift the number wheels in position such that the sector 27 will engage with the pinions 30 and when the elbow lever is so moved the pawl 45 engages the said elbow lever to retain it in such position. When one of the wheels of the totaling mechanism is turned ten divisions, the wheel of the next higher order is brought into action by the following mechanism.

As before stated each of the pinions 30 has integral therewith a finger 31 adapted to engage at the end of each complete rotation of the said pinion an appendix 52 on a lever 50 pivotally mounted on a shaft 51. The said levers are also provided upon their upper ends with two stops 53, 54, the stop 53 being on a higher plane than the stop 54 and each of the sectors is provided with a stop 28 adapted to engage one of said shoulders.

The levers 50 are connected at their lower ends by a link 55, with one end of the stop lever 56 pivoted upon a shaft 57, the other end of the stop lever being adapted to be engaged by one arm of a pawl 60 pivoted on a shaft 61. The levers 50 are normally retained in position for engagement by the finger 31 by means of a spring 58 connected with the link 55, and acting to draw rearwardly the lower end of the lever 50, such motion being, however, limited by the stop 59. The pawl 60 is also normally retained in position for engagement by the lever 56 by means of a spring 62.

It will be evident from the description that when the finger 31 engages the appendix 52 of the lever 50 the lever 56 will be swung into position for engagement by the pawl 60 whereby to retain the lever 50 with the appendix out of position for engagement by the finger 31.

Each time the cage 8 is lowered the pawls 60 are released from the levers 56 whereby to permit the levers 50 to return to their original position this release being effected by the transverse bar 63 having its ends mounted in the corresponding arms of the elbow levers 64, said elbow levers being pivotally mounted on a shaft 65, and having connected with their other arm a rod 66, to which is connected a link 67, connected to one end of the pawl 68 pivoted at 69 and adapted for engagement by a stop 70 upon a depending arm 71 secured to the cage 8. The rod 63 is normally maintained out of engagement with the pawl 60 by means of a spring as shown. When the cage is lowered the stop 70 engages the end of the pawl 68 thus rocking the elbow lever 64 and depressing the rod against the rear ends of the pawls 60, thus elevating the front ends of the said pawls and releasing the levers 56.

It is evident that in totaling the sale of tickets, it will be necessary to have a greater number of figure wheels than stepped plates and additional wheels 29ª integral with the pinions 30ª and provided with integral fingers 31ª are arranged upon the same shaft 32, and the said figure wheels are operated by toothed sectors 72 pivoted on the shaft 26 before described and retained in normal position by the spring 74. Each lever 72 carries a stop 72ª similar to the stop 28 before described and which is adapted to rest upon one of the shoulders 53ª 54ª of levers 50ª pivoted upon the shaft 51 and similar in all respects to the levers 50 before described, each of the levers 50ª being provided with an appendix 52ª for engagement by the finger 51ª.

The difference of level between the shoulders 53ª, 54ª is such that when the stop 72ª comes to rest on the shoulder 54ª the corresponding figure wheel will be rotated one tooth. The levers 52 are returned to their original position at the next descent of the cage by means of the adjustable stop 75 arranged upon the depending arm 48.

As has been before stated the shaft 2 which carries the tension drum 1 of the band wheel has keyed thereon the drum 3 of the printing machine, over which passes the band whose links consist of printing blocks 76. The blocks 76 are provided upon their upper face with a form 76ª of printed matter common to all the tickets, and if desired a fixed composing stick 77 carrying the indications common to all the tickets as well as the date may be arranged at the side of the chain. The sheet of cardboard which is to be cut and printed for the tickets is arranged upon a roller 78 and passes beneath a table 79 between the feed rollers 80 and 81, and between the blades of scissors 82, said feeding rollers and scissors being carried by the table. The table has secured thereto a rack 83 movable in the guideway 84, and engaged by a toothed sector 85 secured to a shaft 86, which shaft is provided with an arm 87 connected by a link 88 with one end of the lever 89 journaled on the shaft 90 and provided with a handle whereby to manipulate the said lever.

The inking roller 91 is carried by a frame 92 journaled on a shaft 93 and is pressed by a spring coiled around the shaft 94 against the impression blocks 76. The side pieces of the frame 92 are each provided with a cam surface 94 which surfaces are engaged by the end of a shaft 95 carried by the impression table whereby to move said frame to one side when the impression table descends. The operating lever 96 of the scissors 82 is pivoted upon the shaft 95 and the said operating lever is operated by fixed stops 97—98 on the frame between which stops the outer end of the lever 96 moves. It will be noticed that when the impression table descends one end of the lever 96 by engagement with the stop 98 will cause the other end to move the movable blade of the scissors whereby to sever the printed ticket, and that when the table is elevated this action will be reversed.

A check sheet 99 passes beneath the table 79, the said sheet being arranged at the side of the card-board sheet upon which the ticket is printed and adapted to receive an impression from a step line 103 on the impression block 76 and to one side of the form for the tickets. This check sheet passes from a roller 100 beneath the table to a roller 101, and the latter roller is provided with a ratchet wheel 105, and is intermittently driven by a pawl 104, pivoted to one end of a lever 106 journaled on the shaft 107 of the roller 101, the other end of the arm being movable in a slot 108 in an arm 109 depending from the frame. It will be understood that when the impression table 79 descends, the end of the arm 106 engaging the slot contacts with the lower end of the slot thus swinging the arm on its pivot and depressing the outer end of the arm whereby to bring the pawl into engagement with another tooth of the ratchet wheel while when the table rises, the pawl arm will engage the other end of the slot thus swinging the arm in such manner as to move the ratchet wheel.

One of the feed rollers 80 for the cardboard sheet is provided at one end with a disk having a plurality of projecting pins which are adapted to be engaged by a square shoulder of the elbow lever 111 during the upward motion of the table the upper surface of the shoulder being inclined whereby to permit the pin to swing the elbow lever aside during the downward movement of the table. The opposite end of the lever is acted upon by a spring 113 and a stop 114 is provided for limiting the swinging motion of the arm toward the impression table. The pins 110 are so disposed on the disk that each advance of the sheet of cardboard corresponds to the length of the ticket to be cut off. After the ticket is printed and cut off it falls upon a plaform 116 and is ready for delivery. The printing blocks 76 are ordinarily each supplied with totaling mechanism for registering the total number of impressions made by the said block and a locking mechanism is made use of to lock the chain during the impression.

An index 117 is placed at the front end of the machine in order that the operator may know when the proper block is in position beneath the impression table, the said index being connected with an endless belt 119, operated in any suitable manner by a shaft 2, and movable in front of an indication table 118. In order to compel the operator each time to move the operating lever 89 completely to the end of its stroke, a pawl is mounted on the lever pivoted to a shaft 121 and engaging a notched sector 122 fixed upon the frame. It will be understood that the pawl 120 will engage one of the notches of the sector if it is attempted to return the lever before the said pawl is completely disengaged from the sector and before the lever 89 has completed its stroke in either direction.

To permit the verification of the operation made by the adding mechanism of the controlling apparatus a sheet 123 called a statistic sheet is arranged in position to receive impressions from the printing blocks, the said sheet being arranged at the front of the machine and supported by a stock roller 124, from which it passes over a rubber roller 125 and emerges at the front of the machine.

The roller 125 is mounted upon a swinging support 126 journaled on a shaft 127 and provided with an arm 128 engaged with a setscrew 129, for retaining the said roller out of contact with the printing blocks, a spring acting to move the said roller into contact with the blocks. An inking roller 130 is journaled on the support 126 for inking the blocks in order that they may make an impression on the sheet. When it is desired to bring this part of the apparatus into operation the setscrew 129 is loosened allowing the spring to move the roller into contact with the blocks and the movement of the blocks moves the strip of paper 123. The shaft 2 is rotated by means of a capstan 131 and all of the parts of the printing mechanism are operated by a lever 89 through the connections before described.

In operation by means of the capstan 131 the block 76 corresponding to the ticket to be issued is brought beneath the impression table 79, the index 117 indicating when the block is properly positioned. In accordance with the movement of the block 76 corresponding to the ticket to be printed, the link of the band 4 having perforations to correspond to the price of said ticket is brought into position above the cage 8, and above the step plates 22. The operating lever 89 is then lowered, which permits the downward movement of the cage 8, the grid 9 engaging the upper face of the link and carrying the link along with it. The step plates are engaged by the perforations of the link and are lowered by it, the moment they engage the perforation with the width of plate corresponding to the width of the perforation. The amplitude of the vertical movement communicated to each step plate is a function of the length of the perforation of the link which the latter has traversed. The descent of the step plates operates the sectors 25, 27, through the intermediary of the racks 24 and moves them over a distance proportionate to the length of the perforation. At the end of the downward movement of the cage 8 the stop 49 on the rod 48 encounters the short arm of the lever 41 and moves the long arm thereof in the direction shown by the arrow in Fig. 7 and into position for engagement by the pawl 45. This movement elevates the frame carrying the numbering wheels into position so that the sectors engage the pinions and such movement of the frame releases the pawls 36 from the pinions. At the moment when the pinions 30 and 30ᵃ are engaged with the sectors 27 and the toothed ends of the levers 72 the lever 41 is locked by the pawl 45 thus retaining the frame immovable in such position. When the cage 8 has reached the bottom of its stroke the operating lever through the lost motion connection with the cage is permitted to move a slight distance farther in order to bring the printing mechanism into operation. This further movement of the lever 89 lowers the impression table 79 and applies the sheet of cardboard to the impression block 76, and the sheet 99 against the impression 103 of the block. The descending movement of the table 79 opens the scissors 82 by the mechanism before described and toward the end of such descending movement the end of the lever 106 strikes against the bottom of the slot 108 thus moving the said lever to engage the pawl 104 with another tooth of the ratchet wheel, so that when the table ascends the feed roller 101 will be rotated to advance the check sheet. When the operating lever 89 has reached the bottom of its stroke it is again raised, thus elevating the impression table, during whose ascending movement the feed roller 80 is rotated to advance the cardboard, and the further movement of the table operates the scissors to sever the printed ticket which falls upon the table 116.

In the adding apparatus the upward movement of the lever 89 raises first the cage 8 as well as the link thereabove, and the raising of the link permits the springs 23 to again elevate the said plates 22. This upward movement of the said plates moves also the sectors 25—27, until the stop 28 encounters either the shoulder 53 or the shoulder 54 depending upon which shoulder is thereunder, the shoulder 53 being in position for engagement with the lever 50 in its normal position. Since the number wheels are locked by the pawl 45 with their pinions in engagement with the sectors, the movement of the steps will impart movement to the numbering wheels, thus moving them a proper distance to register the numbers on the ticket. When the figure wheels for example, the units wheel, is turned ten divisions the finger 31 integral with the wheel encounters the appendix 52 of the lever 50 arranged opposite the next higher wheel, and pushes the said lever back so that it brings the shoulder 54 below the stop 28 instead of the shoulder 53. When the lever 50 is so placed the sector corresponding thereto receives an added movement corresponding to a tooth of the pinion thus registering the total of the lower wheel.

The transfers of the units higher than those represented by the stepped plates are effected by the lever 72 operating in a similar manner to the sectors, and brought into operation by the same mechanism as before described. Just before the end of the rise of the cage 8, the step 47 of the rod 48 lifts the pawl 45 thus unlocking the number wheel frame and permitting it to return to its original position.

I claim—

1. In a device of the class described, the combination with the printing mechanism comprising an endless chain of impression blocks, each block bearing a ticket form and a check form, of means for supporting a strip of cardboard above the ticket form, means for supporting a strip of paper above the check form, an impression table above the strips, a device for totaling the amounts of the tickets sold, comprising a plurality of number wheels, a plurality of vertically movable plates corresponding in number to the number of the number wheels, a connection between the plates and the number wheels whereby the upward movement of said plates will rotate the number wheels, each of said plates having the upper end thereof provided with a plurality of steps or gradations corresponding in number to the digits, an endless chain comprising a plurality of hinged links, each of said links being provided with a plurality of slots of different lengths, the different lengths corresponding to the respective distances between the bases of the steps and the fronts of the plates, each of said links having slots corresponding in number to the number of digits in the price of a ticket and corresponding in length to that width of plate representing such digit, means for moving the chains in unison whereby to simultaneously place the impression block to be printed in position for making an impression, and the link corresponding thereto in position above the stepped plates, a grid above the link having an opening therein corresponding to the position of the stepped plates, and means for simultaneously operating the impression table to move the cardboard strip and the paper strip against the impression block and to operate the grid to move the link whereby to operate the plates.

2. In a device of the class described, the combination with the printing mechanism, comprising an endless chain of impression blocks, and means for supporting a strip of cardboard above the blocks, of a device for totaling the amounts of the tickets printed, comprising a plurality of number wheels, a plurality of vertically movable plates corresponding in number to the number of the number wheels, a connection between the plates and the number wheels whereby the upward movement of said plates will rotate the number wheels, each of said plates having the upper end thereof provided with a plurality of steps or gradations corresponding in number to the digits, an endless chain comprising a plurality of hinged links each of said links being provided with a plurality of slots of different lengths, the different lengths corresponding to the respective distances between the bases of the steps and the front of the plates, each of said links having slots corresponding in number to the number of digits in the price of a ticket and corresponding in length to that width of plate representing such digit, means for moving the chains in unison, whereby to simultaneously place the impression block of the ticket to be printed in position for making an impression and the link corresponding thereto in position above the stepped plates, means for moving the link downwardly whereby to move the plates; and means for simultaneously moving the cardboard strip against the impression block and operating the link moving means.

3. In a device of the class described, the combination with the printing mechanism comprising an endless chain of impression blocks each bearing a ticket form, of a device for totaling the amounts of the tickets printed comprising a plurality of number wheels, a plurality of vertically movable plates corresponding in number to the number of the number wheels, a connection between the plates and the number wheels whereby the upward movement of said plates will rotate the number wheels, each of said plates having the upper end thereof provided with a plurality of steps or gradations corresponding in number to the digits, an endless chain comprising a plurality of hinged links, each of said links being provided with a plurality of slots of different lengths, the different lengths corresponding to the respective distances between the bases of the steps and the fronts of the plates, each of said links having slots corresponding in number to the number of the digits in the price of a ticket and corresponding in length to that width of plate representing said digits, means for moving the chains in unison whereby to simultaneously place the impression block of the ticket to be printed in position for making an impression and the link corresponding thereto in position above the stepped plates, means for moving the link downwardly whereby to move the plates, and means for simultaneously making the impression and operating the link moving means.

4. In a device of the class described, the combination with the printing mechanism comprising an endless chain of impression blocks each provided with a ticket form, of a plurality of number wheels, and means for operating the number wheels comprising a plurality of vertically movable plates corresponding in number to the number of the number wheels, each of said plates having the upper end thereof provided with a plurality of steps or gradations corresponding in number to the digits, a connection between the individual plates and the individual number wheels, an endless chain comprising a plurality of hinged links each of said links being provided with a plurality of slots of different lengths the different lengths corresponding to the distances between the bases of the steps and the fronts of the plates, each of said links having slots corresponding in number to the number of digits in the price of a ticket and corresponding in length to the width of plate representing said digit, means for moving the chains in unison whereby to simultaneously place the impression block of the ticket to be printed in position for making an impression and the link corresponding thereto in position above the plates, and means for simultaneously depressing the link and making the impression.

5. The combination with the ticket printing mechanism, of a device for totaling the amounts of the tickets printed, comprising a plurality of number wheels, a plurality of vertically movable plates corresponding in number to the number of the number wheels, a connection between the plates and the number wheels whereby the upward movement of said plates will rotate the number wheels, each of said plates having the upper end thereof provided with a plurality of steps or gradations corresponding in number to the digits, an endless chain comprising a plurality of hinged links each of said links being provided with a plurality of slots of different lengths, the different lengths corresponding to the respective distances between the bases of the steps and the fronts of the plates, each of said links corresponding in number to the number of the digits in the price of a ticket and corresponding in length to that width of the plate representing said digit, means for moving the chain whereby to place the link in position above the stepped plates, and means for simultaneously depressing the links and operating the printing mechanism.

6. A device for totaling the amounts of tickets having different values, comprising a plurality of number wheels, a plurality of vertically movable plates corresponding in number to the number of number wheels, a connection between the plates and the number wheels, whereby the movement of said plates will rotate the number wheels, each of said plates having the upper end thereof provided with a plurality of steps or gradations corresponding in number to the digits, an endless chain comprising a plurality of hinged links each of said links being provided with a plurality of slots of different lengths, the different lengths corresponding to the respective distances between the bases of the steps and the fronts of the plates, each of said links having slots corresponding in number to the number of the digits in the price of a ticket and corresponding in length to that width of plate representing said digit, means for moving the chain whereby to place the respective links in position above said plates, and means for moving the link downwardly whereby to operate the plates.

7. A device for adding the amounts of the tickets having different values, comprising a plurality of number wheels each of said wheels having integral therewith a pinion, a plurality of vertically movable plates corresponding in number to the number of the number wheels, each of said plates being provided on one side with rack teeth, levers having toothed segmental ends pivoted between the plates and number wheels, one end of each of said levers meshing with the rack teeth of a plate and the other adapted to mesh with a pinion of a number wheel, each of said plates having the upper end thereof provided with a plurality of steps or gradations, corresponding in number to the digits, an endless chain comprising a plurality of hinged links, each of said links being provided with a plurality of slots of different lengths the different lengths corresponding to the respective distances between the bases of the steps and the fronts of the plates, each of said links having slots corresponding in number to the number of digits in the price of a ticket, and corresponding in length to that width of plate representing said digit, means whereby the downward movement of the stepped plates will move the pinions into mesh with the toothed segments of the levers, means for moving the respective links into position above said plates, means for moving the links downward whereby to depress the plates, and springs for returning the plates to their original positions.

8. In a device of the class described a device for totaling the amounts of tickets having different values, comprising a plurality of number wheels, each of said wheels having a pinion integral therewith, a plurality of vertically movable plates corresponding in number to the number of the number wheels and provided on one edge thereof with rack teeth, a lever pivoted between each of the plates and the corresponding pinion and having segmental toothed ends, one of said ends engaging with the rack teeth and the other being adapted to engage with the teeth of the pinion, each of said plates having the upper end thereof provided with a plurality of steps or gradations corresponding in number to the digits, an endless chain provided with a plurality of hinged links, each of said links being provided with a plurality of slots of different lengths. the different lengths corresponding to the respective distances between the bases of the steps and the fronts of the plates, each of said links having slots corresponding in number to the number of the digits in the price of the ticket and corresponding in length to that width of the plate representing said digit, means for moving the links in position above the stepped plates, means for moving the links downward whereby to operate the plates, means whereby the downward movement of the plates will move the pinions into mesh with the ends of the levers, means for locking the pinions in such position, a spring for returning the plates to their original position whereby to rotate the pinions and means for releasing the locking device.

9. In a device of the class described, a printing mechanism comprising an endless chain of impression blocks, each bearing a ticket form and a check form, means for supporting a strip of cardboard above the ticket form, means for supporting a strip of paper above the check form, an impression table above the strips, a device for totaling the amounts of the tickets printed, comprising a plurality of number wheels, means for operating the number wheels to add the prices of the tickets printed, means for depressing the impression table to carry the strips into contact with the impression blocks, means for operating said depressing means, and the number wheel operating means in unison.

10. In a device of the class described, a printing mechanism comprising an endless chain of impression blocks each bearing a ticket form, means for applying a strip of cardboard to the individual blocks in order to print the ticket, a device for totaling the amounts of the tickets printed, a connection between the printing mechanism and the totaling device to cause said device to add the amount of each ticket as it is printed, and means for operating the totaling device independently of the printing device.

The foregoing specification of my apparatus for the control and the registration of the operations performed by a distributing machine signed by me this 8th day of June 1906.

GEORGES ISIDORE FERDINAND SOULAGE.

Witnesses:
H. C. COXE,
MAURICE H. PIGNET.